United States Patent

Honaga et al.

[11] Patent Number: 4,593,783
[45] Date of Patent: Jun. 10, 1986

[54] POWER STEERING SYSTEM

[75] Inventors: Susumu Honaga, Aichi; Mikio Suzuki, Hekinan; Yoshiharu Inaguma, Nagoya, all of Japan

[73] Assignee: Toyoda Koki Kabushiki Kaisha, Kariya, Japan

[21] Appl. No.: 727,079

[22] Filed: Apr. 25, 1985

[30] Foreign Application Priority Data

Apr. 27, 1984 [JP] Japan .................. 59-87221

[51] Int. Cl.$^4$ .............................................. B62D 5/08
[52] U.S. Cl. ...................... 180/141; 91/446; 91/451; 180/143; 180/147
[58] Field of Search ............... 180/142, 141, 143, 132, 180/146, 147, 149, 133; 91/446, 468, 451, 450, 452, 371, 372

[56] References Cited

U.S. PATENT DOCUMENTS

| 2,791,287 | 5/1957 | Stolte | 180/143 |
|---|---|---|---|
| 2,893,504 | 7/1959 | Jackson | 180/143 |
| 2,939,429 | 6/1960 | Charlson | 137/596 |
| 3,171,298 | 3/1965 | Henry-Biabaud | 180/143 |
| 3,406,773 | 10/1968 | Luther | 180/143 |
| 3,408,900 | 11/1968 | Tomita | 91/371 |
| 3,433,127 | 3/1969 | Thompson | 91/372 |
| 3,465,842 | 9/1969 | Hruska | 180/143 |
| 3,833,081 | 9/1974 | Suzuki | 180/143 |
| 3,930,554 | 1/1976 | Ward | 180/143 |
| 4,034,825 | 7/1977 | Adams | 180/143 |
| 4,189,024 | 2/1980 | Jablonsky | 180/133 |
| 4,329,912 | 5/1982 | de Maight | 91/452 |
| 4,437,532 | 3/1984 | Nakamura | 180/143 |
| 4,485,883 | 12/1984 | Duffy | 180/142 |

FOREIGN PATENT DOCUMENTS

| 821944 | 10/1959 | United Kingdom | 180/132 |
|---|---|---|---|
| 2131364 | 6/1984 | United Kingdom | 180/143 |

Primary Examiner—John J. Love
Assistant Examiner—Everett G. Diederiks, Jr.
Attorney, Agent, or Firm—Oblon, Fisher, Spivak, McClelland & Maier

[57] ABSTRACT

A power steering system which includes an engine-driven pump, a fluid motor for supplementing manual steering torque, a fluid control valve for distributing fluid to the fluid motor, and a reaction device for applying hydraulic reaction or feeling to a steering wheel. A first flow control valve is utilized to deliver first fluid flow to a fluid control valve from the pump and to lead excess flow to a bypass passage. A second flow control valve is connected between the bypass passage and the reaction device to deliver second fluid flow to the reaction device and to lead excess flow to a reservoir. A magnetic pressure control valve is connected to the reaction device to control fluid pressure applied thereto in accordance with a predetermined vehicle operating condition, such as vehicle speed.

5 Claims, 5 Drawing Figures

POWER STEERING SYSTEM

BACKGROUND OF THE INVENTION

1. Field of the Invention

The present invention relates to a power steering system wherein power assistance derived therefrom will be modulated according to a vehicle condition such as vehicle speed.

2. Description of the Prior Art

In maneuvering a steering wheel of an automotive vehicle, it is recognized that power assistance at high vehicle speeds may desirably be less than at low speeds to allow for stabilization of the steering wheel at high speeds.

A power steering system with the above-mentioned steering characteristics is known having a reaction device that is supplied with a fluid pressure which is increased as the vehicle speed increases, thus applying a hydraulic reaction or feeling to the steering wheel. In such prior system, an additional fluid pump which is driven at a rate proportional to vehicle speed is provided to supply the reaction device with fluid pressure proportional to vehicle speed. As a result, it is difficult to control the pressure of the fluid as freely as desired or according to other vehicle conditions such as rotational angle and rotational speed of the steering wheel.

SUMMARY OF THE INVENTION

It is therefore an object of the present invention to provide a power steering system, wherein the pressure of the fluid that is supplied to the reaction device may easily be controlled as desired.

Another object of the present invention is to provide a power steering system having the foregoing desirable characteristics and which is of simple construction and is relatively inexpensive.

Briefly, according to the present invention, these and other objects are achieved by providing a power steering system including an engine-driven pump, a fluid motor, a rotatable output shaft operatively connected with the fluid motor, a rotatable input shaft adapted for manual actuation, a fluid control valve for distributing fluid flow to the fluid motor in accordance with relative rotation between the input and output shafts, and a reaction device for providing resistance against relative rotation between the input and output shafts. A first flow control valve is provided which is connected between the pump and the fluid control valve to deliver a first fluid flow to the fluid control valve and to lead excess flow to a bypass passage. A second flow control valve is connected between the bypass passage and the reaction device to deliver a second fluid flow to the reaction device and to lead excess flow to a reservoir. A magnetic pressure control valve is connected to the reaction device to control fluid pressure applied thereto in accordance with a vehicle condition such as vehicle speed.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
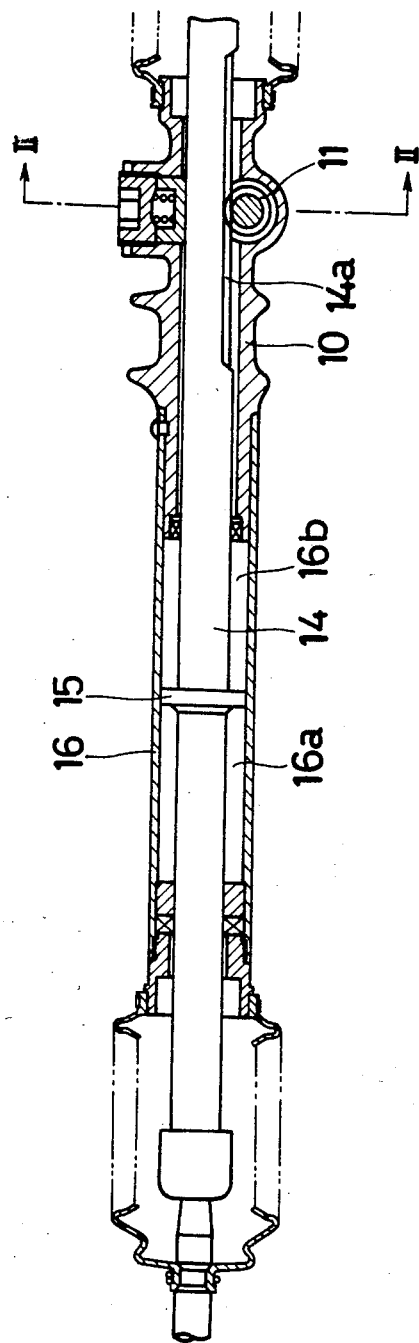
FIG. 1 is a longitudinal sectional view of a power steering system according to the present invention.

Referring to the drawings and to FIG. 1 in particular, reference numeral 10 designates a gear housing that is fixedly mounted on a chassis of an automotive vehicle. A steering rod 14 is slidably mounted on gear housing 10, with opposite ends thereof extending outwardly from gear housing 10. Respective ends of steering rod 14 are connected to steerable wheels of the vehicle by way of a conventional steering link mechanism. A piston 15 of a fluid motor is fixedly attached to a middle portion of steering rod 14 and is slidably accommodated in a cylinder tube 16 that is unitarily connected to gear housing 10.

Figure 2:
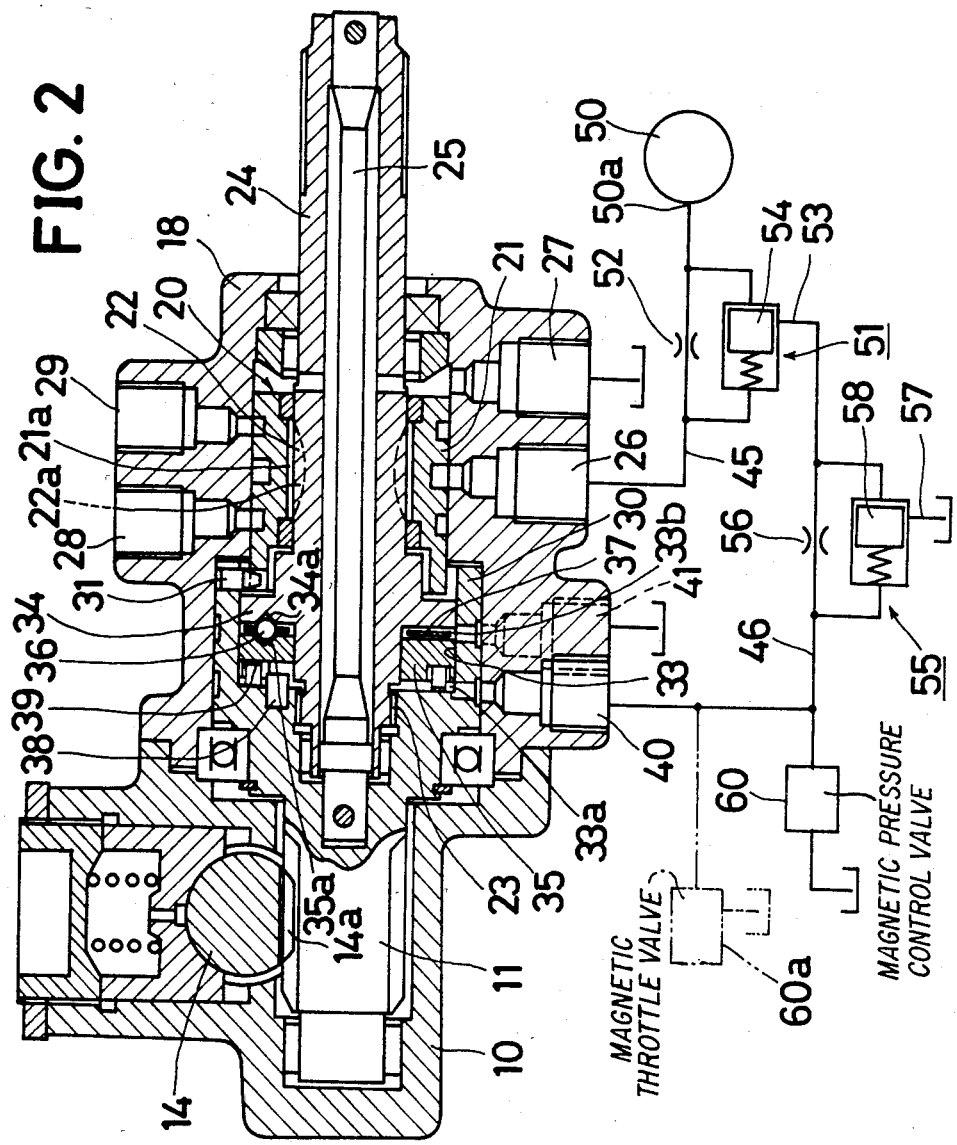
FIG. 2 is an enlarged sectional view taken along line II—II of FIG. 1.

Referring now to FIG. 2, an output shaft 11 is rotatably journalled to gear housing 10 in perpendicular relation with steering rod 14. A pinion is provided on output shaft 11 and is engaged with a rack 14a which is formed on steering rod 14.

A valve housing 18 is fixedly attached to gear housing 10 and accommodates a rotary fluid control servo-valve 20 which comprises a sleeve valve member 21 and a rotary valve member 22. Sleeve valve member 21 is rotatably housed in valve housing 18 in coaxial relation with output shaft 11. Rotary valve member 22 is formed on an input shaft 24 which is connected to a steering wheel. Input shaft 24 is flexibly connected to output shaft 11 by means of a torsion bar 25. Loose engagement of toothed portions 23 of output and input shaft 11 and 24 permits a small amount of relative rotation therebetween. A plurality of axially extending slots 21a, 22a are formed on an internal surface of sleeve valve member 21 and on a circumferential surface of rotary valve member 22 at regular intervals. Thus, according to the relative rotation between sleeve valve member 21 and rotary valve member 22, a supply port 26 communicates with one of cylinder ports 28, 29 which are respectively in fluid communication with left and right chambers 16a, 16b of the fluid motor, and an exhaust port 27 communicates with the remaining port of cylinder ports 28, 29.

A cylindrical portion 30 is formed at an inner end of output shaft 11 and is rotatably received in valve housing 18. Output shaft 11 is connected to sleeve valve member 21 at the end of cylindrical portion 30 by means of a connecting pin 31. A reaction force chamber 33 of a reaction device is formed on cylindrical portion 30 in coaxial relation with output shaft 11. A flange shaped reaction force receiver 34 is provided on input shaft 24 and is rotatably housed in reaction force chamber 33.

A ring shaped reaction piston 35 is axially slidably received in reaction force chamber 33 in face to face relationship with reaction force receiver 34. Reaction piston 35 is prevented from rotation relative to output shaft 11 by means of a pin 38. An inner bore of reaction piston 35 is slidably fitted on input shaft 24 and thus, reaction piston 35 divides reaction force chamber 33 into left and right chambers 33a, 33b. The left chamber 33a is led to a port 40 to which controlled fluid pressure is introduced as described hereinafter. The right chamber 33b is led to a port 41 that is connected to a reservoir. On opposite faces of reaction force receiver 34 and reaction piston 35, four pairs of conical shaped notches 34a, 35a are formed with the same circumferentially interval. Placed between reaction force receiver 34 and reaction piston 35 is a retainer 37 which receives four balls 36 that respectively engage with conical shaped notches 34a and 35a. Reaction piston 35 is urged toward reaction force receiver 34 by a wave spring 39 that is disposed between reaction piston 35 and a bottom wall of reaction force chamber 33.

Reference numeral 50 designates a pump that is driven by an engine of the vehicle. An outlet port 50a of pump 50 is connected to supply port 26 of servovalve 20 by way of a first flow control valve 51. First flow control valve 51 includes a metering orifice 52 which is interposed in a conduit 45 that connects outlet port 50a of pump 50 with supply port 26, and a bypass valve spool 54 that is moved in accordance with the pressure differential across metering orifice 52 so as to keep the pressure differential constant. Thus, a first fluid flow of a sufficient and constant rate is delivered to supply port 26, and any existing excess flow is led to a bypass passage 53 according to the function of flow control valve 51. Bypass passage 53 of first flow control valve 51 is connected to port 40 of reaction force chamber 33 by way of a second flow control valve 55. Second flow control valve 55 also includes a metering orifice 56 which is interposed in a conduit 46 that connects bypass passage 53 with port 40, and a bypass valve spool 58 that is moved in accordance with the pressure differential across metering orifice 56 so as to maintain the pressure differential constant. According to the operation of second flow control valve 55, a second fluid flow of a constant rate is delivered to port 40, and any existing excess flow is led to a reservoir by way of bypass conduit 57. A magnetic pressure control valve 60 is connected to port 40 of reaction force chamber 33.

Figure 3:
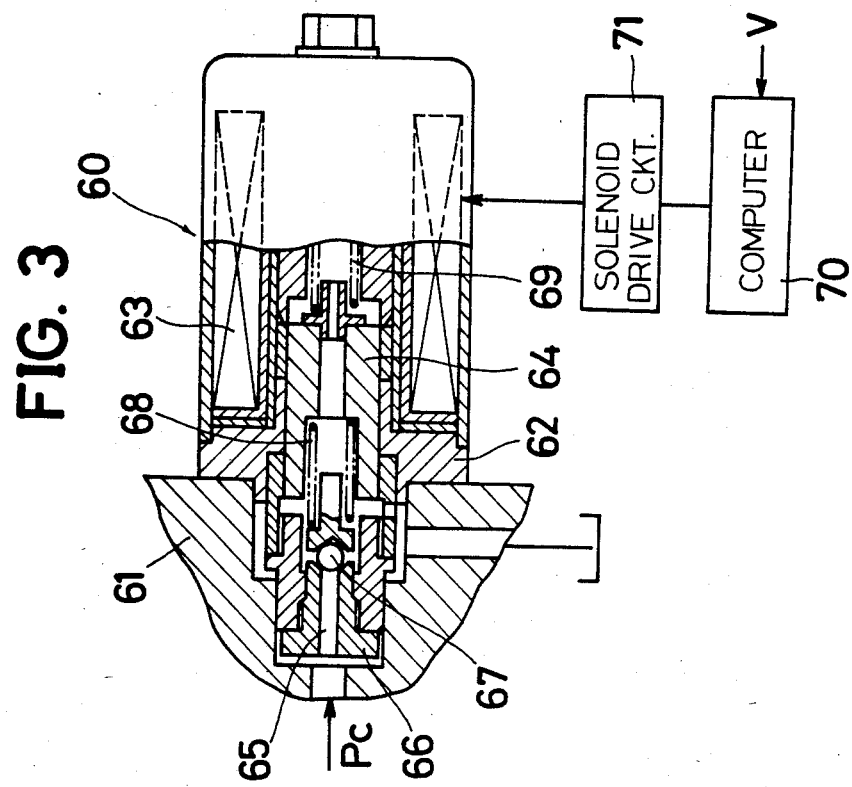
FIG. 3 is a longitudinal sectional view of the magnetic pressure control valve shown in FIG. 2.

Referring now to FIG. 3, magnetic pressure control valve 60 is provided with a valve body 62 which is attached to housing 61, and a solenoid 63 that is secured to valve body 62. A spool member 64 which is adapted to be moved according to excitation of solenoid 63 is slidably accommodated in valve body 62. A valve seat member 66 which is secured to housing 61 is provided with a relief passage 65 that is connected to port 40 of the reaction device. A ball valve 67 which is engageable with valve seat member 66 to close relief passage 65 is urged toward valve seat member 66 by a spring 68 that is interposed between ball valve 67 and spool member 64. Spool member 64 is counterbalanced by a balance spring 69 and is usually maintained at the position shown in FIG. 3 where the force of spring 68 applied on ball valve 67 is maximum. The force of spring 68 will be reduced as spool member 64 is moved against balance spring 69 according to the excitation of solenoid 63. Solenoid 63 is connected to a solenoid drive circuit 71 which in turn is controlled by a computer 70. Current I which is supplied to solenoid 63 is controlled by computer 70 so as to decrease as the vehicle speed V increases. In addition, when current I increases, controlled pressure Pc in relief passage 65, namely, the pressure applied to the reaction device decreases, as shown in FIG. 4.

Figure 4:
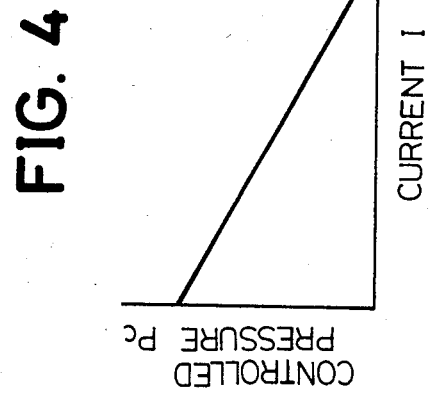
FIG. 4 is a graph showing fluid pressure controlled by the magnetic pressure control valve as a function of current applied thereto.

A magnetic throttle valve 60a which is operative to vary the area of a throttle according to current supplied to a solenoid thereof controls pressure Pc as a function of the current as shown in FIG. 4, and may be substituted for magnetic flow control valve 60.

The operation of the power steering system as described above will now be explained. Fluid flow discharged from pump 50 is divided into a first fluid flow of constant rate and an excess flow by first flow control valve 51. The first fluid flow is delivered to supply port 26 of servo-valve 20 to be distributed to the fluid motor. The excess flow is also divided into a second fluid flow of constant rate and an excess flow which is bypassed to the reservoir. The second fluid flow is delivered to port 40 of the reaction device and is led to the reservoir by way of magnetic pressure control valve 60. While the vehicle speed is low, the force of spring 68 is null because a maximum current I is supplied to solenoid 63. Therefore, controlled pressure Pc, namely, the pressure in the left chamber of reaction force chamber 33 is kept substantially null, and, in turn, reaction piston 35 is urged toward balls 36 only by the resilient force of wave spring 39. Thus, when input shaft 24 is turned according to manual maneuvering of the steering wheel, reaction piston 35 is easily retracted against wave spring 39, resulting in easy relative rotation between sleeve valve member 21 and rotary valve member 22 in a usual power assisted steering operation.

When the vehicle speed is above a predetermined rate, computer 70 controls solenoid drive circuit 71 in accordance with a signal corresponding to vehicle speed V so that current I supplied to solenoid 63 of magnetic pressure control valve 60 decreases as vehicle speed increases. Therefore, when the vehicle speed increases, the force of spring 68 increases proportionately, and, in turn, the pressure applied to the left chamber of reaction force chamber 33 increases correspondingly. Thus, reaction piston 35 is urged toward balls 36 with a thrust force corresponding to controlled pressure Pc. Such increases the manual torque which is necessary to generate relative rotation between sleeve valve member 21 and rotary valve member 22 and, as a result, produces less power assistance at higher vehicle speeds than at lower speeds.

Figure 5:
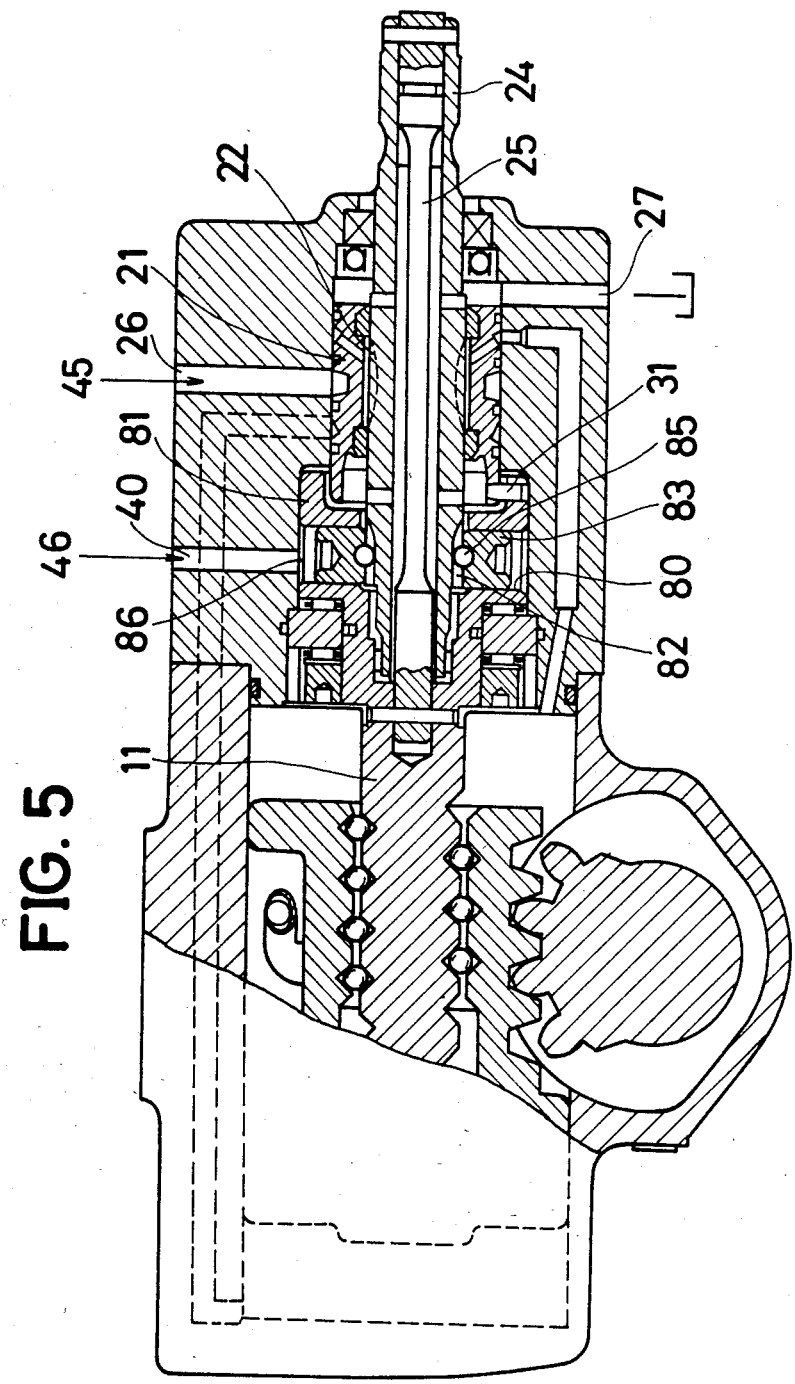
FIG. 5 is a fragmentary longitudinal sectional view of a second embodiment of a power steering system according to the present invention.

Another example of a reaction device is shown in FIG. 5, wherein four reaction force cylinders 80 are radially formed at a cylindrical portion 81 of output shaft 11 at the same circumferentially interval. Four V-shaped grooves 82 are formed on an exterior surface of input shaft 24 opposite to reaction force cylinders 80. Plungers 83 which are slidably mounted in respective cylinders 80 include balls 85 which engage with grooves 82 respectively. An annular groove 86 is provided on an outer surface of cylinder portion 81 to communicate reaction force cylinders 80 with port 40 to which controlled pressure Pc is supplied.

Although in the above-described embodiments, reaction force cylinders 33 or 80 are formed on a cylindrical portion of output shaft 11, the same effect as in the above-described embodiments can be obtained in the case where the reaction force cylinders are formed on a sleeve valve member.

Furthermore, should it be required, controlled pressure Pc supplied to the reaction device might be controlled according to another vehicle condition such as the rotational angle or rotational speed of the steering wheel or a desirable combination of selected vehicle conditions.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power steering system which utilzies a fluid pump driven by a drive source and a fluid motor for supplementing manual steering torque, comprising:
   a valve housing;
   a rotatable output shaft partially positioned within said valve housing and operatively connected with said fluid motor;
   a rotatable input shaft partially positioned within said valve housing and aligned with said output shaft and adapted for manual actuation;
   rotary fluid control valve means located in said valve housing for distributing fluid flow to said fluid motor in accordance with relative rotation between said input and output shaft;
   a reaction device located in said valve housing for providing resistance against relative rotation between said input and output shaft in accordance with fluid pressure supplied thereto;
   first flow control valve means connected between said fluid pump and said rotary fluid control valve means for delivering a first fluid flow to said rotary fluid control valve means and for leading excess flow to a bypass passage;
   second flow control valve means connected between said bypass passage and said reaction device for delivering a second fluid flow to said reaction device and for leading excess flow to a reservoir; and
   magnetic pressure control valve means connected to said reaction device for controlling fluid pressure applied thereto in accordance with a predetermined vehicle operating condition.

2. A power steering system as set forth in claim 1, further comprising a torsion bar which interconnects said output shaft and said input shaft.

3. A power steering system as set forth in claim 1, wherein said reaction device further comprises:
   a reaction force chamber formed on said output shaft in coaxial relation therewith;
   a reaction force receiver formed on said input shaft and rotatably housed in said reaction force chamber;
   a reaction piston received in said reaction force chamber so as to be prevented from relative rotation therewith and which is adapted to be urged toward said reaction force receiver by fluid pressure applied thereto; and
   engaging means engageable with both said reaction force receiver and said reaction piston.

4. A power steering system as set forth in claim 1, wherein said reaction device further comprises:
   a reaction force cylinder radially formed on said output shaft;
   a plunger slidably mounted in said cylinder and adapted to be urged toward said input shaft by fluid pressure applied thereto; and
   engaging means formed on said input shaft for engaging with said plunger.

5. A power steering system which utilizes a fluid pump driven by a drive source and a fluid motor for supplementing manual steering torque, comprising:
   a valve housing;
   a rotatable output shaft partially positioned within said valve housing and operatively connected with said fluid motor;
   a rotatable input shaft partially positioned within said valve housing and aligned with said output shaft and adapted for manual actuation;
   rotary fluid control valve means located in said valve housing for distributing fluid flow to said fluid motor in accordance with relative rotation between said input and output shaft;
   a reaction device located in said valve housing for providing resistance against relative rotation between said input and output shaft in accordance with fluid pressure supplied thereto;
   first flow control valve means connected between said fluid pump and said rotary fluid control valve means for delivering a first fluid flow to said rotary fluid control valve means and for leading excess flow to a bypass passage;
   second flow control valve means connected between said bypass passage and said reaction device for delivering a second fluid flow to said reaction device and for leading excess flow to a reservoir; and
   magnetic throttle valve means connected to said reaction device and including means for varying the area of a throttle portion of said throttle valve in accordance with a predetermined vehicle operating condition.

* * * * *